2 Sheets—Sheet 1.

J. CROSBY, dec'd.

WHITTIER MACHINE COMPANY, Assignees.

INVALID-BEDSTEAD.

No. 6,790. Reissued Dec. 7, 1875.

Witnesses.
L. H. Latimer
W. J. Pratt

Inventor
Whittier Machine Company
Assignees Josiah Crosby
per Geo. H. Gregory Atty.

N. PETERS, PHOTO-LITHOGRAPHER, WASHINGTON, D. C.

J. CROSBY, dec'd.

WHITTIER MACHINE COMPANY, Assignees.

INVALID-BEDSTEAD.

No. 6,790. Reissued Dec. 7, 1875.

Witnesses.

L. H. Bratince,

W. J. Pratt.

Inventor.

Whittier Machine Company
Assignees of Josiah Crosby
per Crosby & Gregory
atty's.

N. PETERS, PHOTO-LITHOGRAPHER, WASHINGTON, D. C.

UNITED STATES PATENT OFFICE.

WHITTIER MACHINE COMPANY, OF BOSTON, MASSACHUSETTS, ASSIGNEE, BY MESNE ASSIGNMENTS, OF JOSIAH CROSBY, DECEASED.

IMPROVEMENT IN INVALID-BEDSTEADS.

Specification forming part of Letters Patent No. 43,900, dated August 23, 1864; reissue No. 6,790, dated December 7, 1875; application filed November 24, 1875.

*To all whom it may concern:*

Be it known that JOSIAH CROSBY, of Manchester, in the county of Hillsborough and State of New Hampshire, invented a new and useful Improvement in Invalid-Beds; and that the following is a full and exact description thereof, reference being had to the accompanying drawings, and to the letters of reference marked thereon, making part of this specification, in which—

Figure 1:
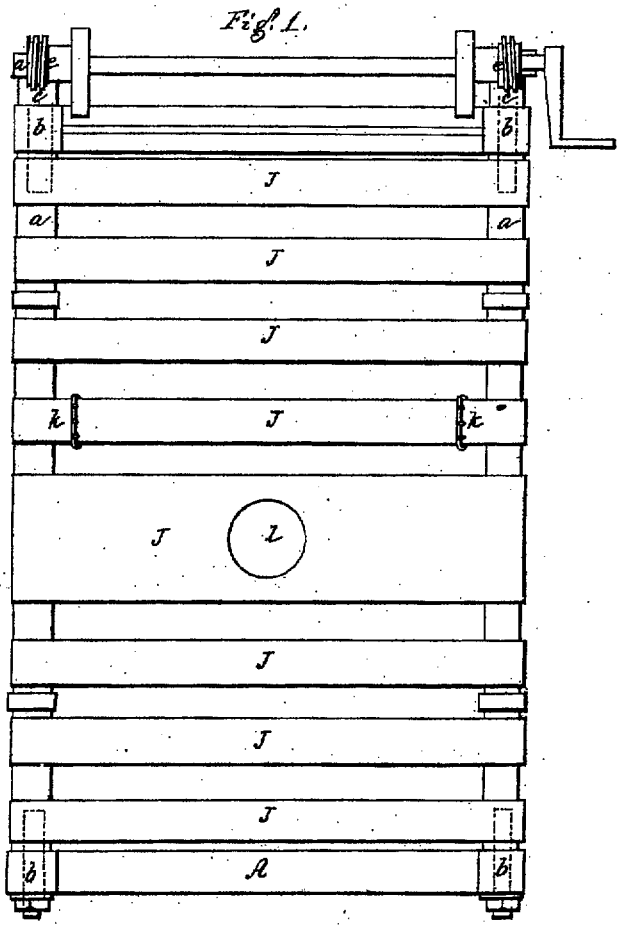
Figure 2:
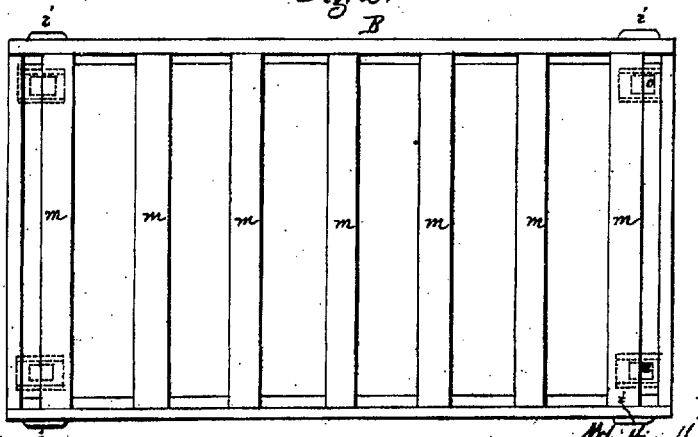
Figure 3:
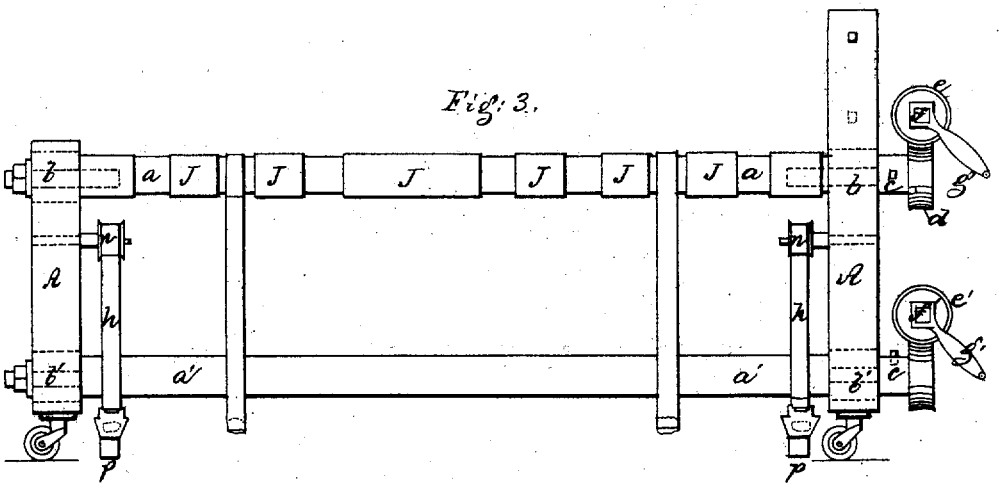
Figure 4:
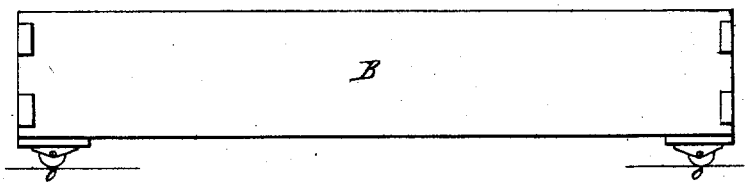
Figure 5:
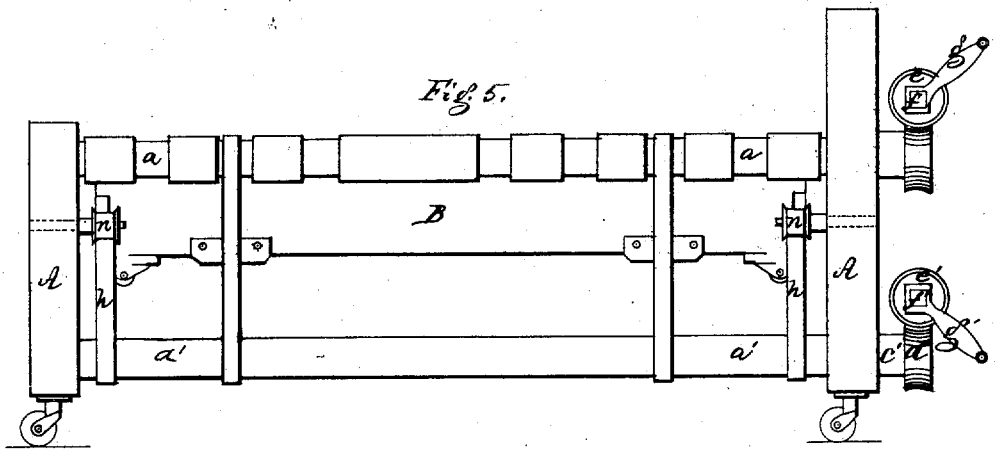

Figure 1 is a plan of the bedstead. Fig. 2 is a plan of trundle-bed or support adapted to sustain and raise or lower the person. (Shown as removed from the bedstead or outer inclosing-frame.) Fig. 3 is an elevation of the bedstead. Fig. 4 is an elevation of the trundle-bed. Fig. 5 is an elevation of the bedstead and trundle-bed as combined.

The same letters refer to the same parts in all the drawings.

A is the bedstead. *a a* are the upper rails, having their axes sustained in suitable bearings in the posts of the frame of the bedstead. *d d* are worm-gears on the ends of the axes of the rails *a a*, by which they are revolved, and which are operated by the worms *e e* on the shaft *f*, turned by a crank, as shown at *g g*. *a′ a′* are revolving rollers or drums, having their axes in suitable bearings in the stationary or non rising and falling frame or posts of the bedstead. Upon the ends of the rollers or drums are the worm-gears *d′ d′*, operated by the worms *e′ e′* on the shaft *f′*, by which the rollers or drums are revolved. *h h* are bands or suspensories attached to the rollers or drums *a′ a′*, that pass upward and over suitable pulleys *n n*, and then to the bed or support. On the ends of these bands or suspensories are hooks *p p*, by which the bands are connected with the trundle-bed or support B, and through which the support is raised or lowered as the bands are wound on or unwound from the drums *a′ a′*. B is a trundle-bed or support on which the person rests, and by which the person may be raised or lowered, and it is of such size as to pass freely under and inside of, and so as to be moved up and down between, the posts of the bedstead or frame to which are attached the rollers or drums and the worm-shaft, the support being connected with the rollers or drums *a′ a′* through the bands or suspensories *h h*. (Shown as provided with hooks *p p*, to engage catches *i i*.) The trundle-bed carries the mattress that supports the person and the usual under bedding, the upper bedding being placed over the top of the bands J J, connected with the rails *a a*. The belts or straps J J are fastened to the rails *a a*, and are made adjustable to the length desired by buckles or other equivalent devices, as at K, and the straps J are tightened or made slack by the revolution of the rails *a a*, turned by the worm-gears *d d* and worms *e e*. These straps are made of any desired width, with opening for the convenient use of the bed-pan, as shown at *l*, or for other similar purposes. The bottom of the bed is made with elastic strips or slats, as shown at *m m*, or in any other convenient mode.

The operation of this invalid-bed is as follows: Suppose the trundle-bed or support for the person separated from the bedstead in the relative position shown in Figs. 1 and 2, with a proper bed placed thereon. Then it is placed within the frame of the bedstead; the hooks *p p* are fastened into the catches *i i*, and then, by the revolution of the rollers or drums *a′ a′* by the action of the worms *e′ e′* on the teeth of the worm-gears *d′ d′*, the trundle-bed or support is raised up into contact with the transverse bands J J, the latter being slackened, if desired, by turning inwardly the rails *a a*, so that the bands J J lie loosely on the bed. The patient rests on the mattress of the trundle-bed, held up or suspended by the suspensories *h*, the straps J, however, being between the patient and the rising and falling trundle-bed, the straps being preferably quite slack or loose. Now, if the bed is to be lowered in order to use the bed-pan, or to remove the bedding, or to bathe the patient, or to perform any other operation, the rails *a a* are revolved until straps J J are brought to the requisite degree of tension to temporarily sustain the patient. Then the rollers or drums *a′ a′* are revolved by the worms *e′* on the shaft *f′*, they engaging the worm-wheels *d′* on rollers or drums *a′*, and the trundle-bed is lowered, leaving the patient supported on the bands J J. Then the pan may be placed on the bed, and the bed be raised and brought in contact with the person of the patient through the opening *l* by turning the drums *a′ a′*; or, if it is desired to move the person away, the bed may be lowered to the floor and run out, as shown in Figs. 1 and 2.

The bed may be moved, so that the patient will be more or less supported by the straps and bed, for purposes of ventilation, or to prevent bed-sores, or for other purposes.

Some of the more obvious advantages which this bed has over others are the facility it affords in treating bed-sores or preventing their occurrence, and the ease with which parts of the body in contact with the bed can be ventilated and bathed, or dressings applied to wounds in those situations without moving the patient; the readiness with which defecation can be accomplished by the aid of a single assistant in case of severe injury, and the general cleanliness and freedom from fetor.

The threads of the worms *e* or *e′* on the shafts *f* or *f′* are pitched or inclined in opposite directions, and the teeth of the worm-gears *d* or *d′* are correspondingly fitted to receive them, (or, in other words, one worm is made right and the other left,) by which construction the strains on the worm-shaft are opposed, thereby overcoming end-thrust, which would result if the shaft had both right or both left worms. The weight to be raised, acting through the reverse worms, gives a longitudinal strain to the shaft between the worms, and end-thrust is obviated.

The support or bed is connected with each of its operating-rollers through two or more bands or suspensories, to elevate the support properly and safely.

I claim—

1. A stationary frame, two rollers or drums provided with worm-toothed wheels, and sustained therein, and a support adapted to sustain and elevate a person, and bands or suspensories connected with the rollers or drums and support, in combination with a shaft provided with worms to engage and rotate the rollers or drums, to wind or unwind the bands or suspensories, and elevate or lower the support, substantially as described.

2. A frame, two oppositely-arranged drums supported thereon, suspensories connected with the drums, and pulleys over which the suspensories pass to a movable support, in combination with worm-gears on the drums and a shaft mounted in the drum-frame, and provided with reverse worms to wind and unwind the suspensories, and raise and lower the support, the combination being and operating substantially as described, to avoid end-thrust, as set forth.

3. A frame adapted to support two rollers or winding-drums, each provided with two or more bands or suspensories and a worm-gear, and a second shaft supported on such frame, and provided with a right and a left worm-gear, to rotate the rollers and wind and unwind the suspensories, in combination with a movable support, to which the bands or suspensories are connected, substantially as described.

4. The combination of the frame A, rollers *a*, and devices adapted to operate them, as described, with the adjustable transverse straps J J and trundle-bed, all substantially as described, and for purposes described.

5. In combination, the bedstead and revolving rollers *a* and *a′*, adjustable bands J J, and the trundle-bed, adapted to be raised in contact with the bands J J, substantially as described.

CHARLES WHITTIER,
*President Whittier Machine Co.*

Witnesses:
G. W. GREGORY,
S. B. KIDDER.